Oct. 18, 1949.    G. A. DECKER    2,485,262
RADIO NAVIGATION TRAINING DEVICE
Filed July 27, 1946    3 Sheets-Sheet 1

GEORGE ALTON DECKER
INVENTOR

ATTORNEYS

GEORGE ALTON DECKER
INVENTOR

ATTORNEYS

Oct. 18, 1949.　　　　　G. A. DECKER　　　　　2,485,262

RADIO NAVIGATION TRAINING DEVICE

Filed July 27, 1946　　　　　　　　　　　　　3 Sheets-Sheet 3

GEORGE ALTON DECKER
INVENTOR

BY
ATTORNEYS

Patented Oct. 18, 1949

2,485,262

UNITED STATES PATENT OFFICE 2,485,262

RADIO NAVIGATION TRAINING DEVICE

George Alton Decker, Fenton, N. Y., assignor to Link Aviation, Inc., Binghamton, N. Y., a corporation of New York Application July 27, 1946, Serial No. 686,605

3 Claims. (Cl. 35—10)

1

This invention relates to means for use in conjunction with grounded aviation trainers for simulating the operation of those radio ranges commonly referred to as YG or ZB ranges.

For many years radio ranges have formed a most important part of equipment utilized to assist in the navigation of aircraft. These ranges have conventionally taken the form of a transmitting system which transmits distinctive code signals into different sectors radiating from the location of the transmitters, and by intercepting and interpreting the code signals, the pilot or navigator of the plane is able to locate the position of the airplane with respect to the known position of the transmitting station. Perhaps the best known of such ranges is the conventional A–N ranges which are operated under the jurisdiction of the Civil Aeronautics Administration.

In recent years a different system of radio ranges has been devised, this system known as the YG or ZB system. Its primary use has been under military conditions where the transmitter itself is located in a movable fashion, e. g., upon an aircraft carrier. Such ranges are characterized by the fact that different code signals are transmitted into different sectors surrounding the transmitter, the signals being transmitted into any one sector varying according to the day and hour so that should the signals be intercepted by enemy aircraft the interceptor would not know the direction of the transmitter from his location. Periodically the code signals transmitted by the YG–ZB range are interrupted and during the period of interruption a different code signal is transmitted by which the pilot of the plane will be able to identify the ship upon which the transmitter is located. In order that the friendly pilot may know, upon the interception of a given code signal, the sector in which he is located, and consequently the direction of the transmitter from his location, each friendly pilot carries a code table telling him the various hours during the day during which a particular oriented code pattern will be transmitted. In order that this general system may be better understood, reference is made to Fig. 1, in which the YG or ZB transmitter may be assumed to be located at the point T where the north-south and east-west lines intersect.

A very high frequency carrier wave is transmitted from a rotating directional antenna. This radiation is a directional beam approximately 45 degrees wide, which is rotated by mechanical rotation of the antenna assembly. Due to the

2 directional-beam-type radiation, a receiver in an airplane remotely located from the antenna will receive only those signals which are radiated in the general direction of the receiver.

The transmitted carrier wave pattern is revolved clockwise through 360 degrees of azimuth at the rate of one revolution every 30 seconds. As it is revolved, international Morse code characters are impressed on the carrier wave at definite intervals. A different character is used during each 30 degrees of rotation, and this character is transmitted twice in its 30 degree sector.

Figures 1, 2:
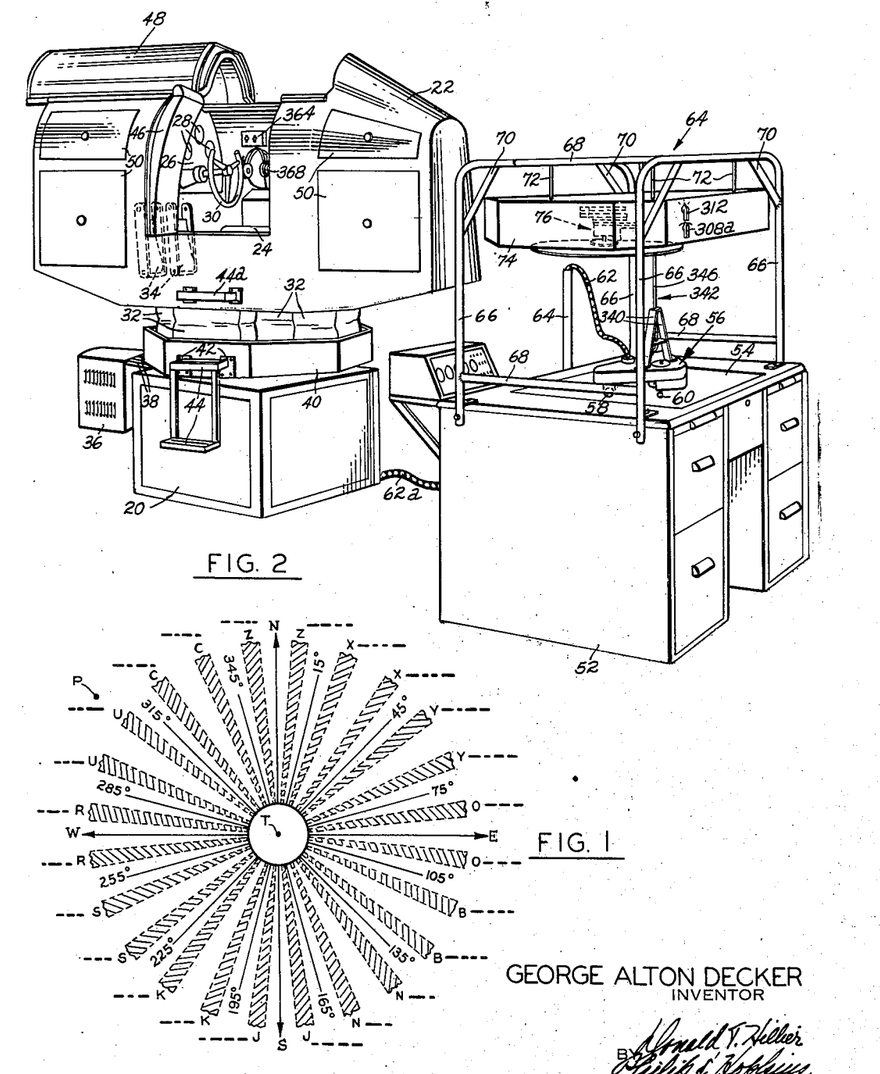
Fig. 1 is an illustrative drawing of a possible pattern of the field of radiation of ranges of the type being considered.
Fig. 2 is a perspective view of one type of well-known training equipment with which my invention may be combined.

In Fig. 1, by way of illustration, as the antenna turns through the first 30 degrees of rotation, starting with the 345-degree azimuth bearing, the code character "Z" may be impressed on the carrier wave when the antenna passes the 352½ degree point, and again when the antenna passes the 7½ degree point. As the antenna turns through the next 30 degrees of rotation, the code character "X" may be impressed on the carrier wave when the antenna passes the 22½ degree point, and again when it passes the 37½ degree point. As the antenna rotates through the remaining 30 degree sectors, a different character will be impressed on the carrier wave, twice in each sector. Thus the characters are impressed on the carrier wave at 15-degree intervals, but only for the duration of the character. The complete transmission is set up in relation to north, south, east and west, so that each directional coding character is always sent in the same direction on each revolution of the antenna assembly.

The only signals heard by the operator in an aircraft located at a distance from the transmitter are those radiated in that direction, and those approximately within 22½ degrees on each side.

The pilot or operator (hereinafter referred to as the pilot) tunes to the carrier frequency of the transmitter and notes the comparative strength of the signals heard as well as their sequence. For example, if a plane were located at P in Fig. 1, first he will hear the letter "U" comparatively weak, then the letter "U" strong, and then the letter "C" weak. He can then consult his code chart and note that he is located at about 307 degrees from the transmitter. In order to reach the home base at the transmitter, he flies the reciprocal of 307 degrees.

During each tenth rotation of the antenna assembly, the above described directional coding sequence is changed to a special code for the identification of the transmitter. This is necessary inasmuch as other transmitters may be in the vicinity. Eight pairs of station identification letters are transmitted during this tenth revolution, the center line of the first pair being 22½ degrees either side of north, and the center lines of the other pairs being every 45 degrees therefrom.

When the plane is in the immediate location of the transmitter, signals transmitted through the entire 360 degrees of rotation may be heard, as shown in the center of Fig. 1.

This invention aims to provide improved equipment which may be used in conjunction with grounded aviation trainers to simulate the operation of real YG–ZB ranges, whereupon valuable training may be secured, under controlled conditions, in navigation by means of the ranges in question.

In order that the preferred embodiment of my invention may be clearly understood, reference is made to the accompanying drawings, wherein.

Referring now to Fig. 2, it will be seen that the stationary base of the trainer is designated 20 and the fuselage by 22. Within fuselage 22 is provided a seat 24 facing the instrument panel 26 upon which are mounted a plurality of instruments 28, the appearance of which simulates the respective instruments used in actual instrument flight. A control wheel 30 is provided, and fuselage 22 is supported by a universal joint which in turn is supported by a vertical spindle rotatably mounted in the stationary base 20. A plurality of collapsible-expansible bellows 32 are provided, the upper sides of these bellows being affixed to the bottom of fuselage 22, and the lower portions of these bellows are affixed to cross arms which carry the octagon 40. The cross arms also are affixed to the rotatable vertical spindle for rotation therewith. Control wheel 30 is arranged to control the expansion of bellows 32 so that the student occupying seat 24 may, by manipulation of the control wheel 30, cause the fuselage 22 to assume diving or banking attitudes, or combinations thereof, in the same manner that he would cause a real plane to assume corresponding attitudes. Within the fuselage 22 are provided a pair of rudder pedals 34 which are arranged to energize the turning motor 36 to rotate the fuselage 22 about its vertical axis in a direction dependent upon which of the rudder pedals 34 is pressed forward. In order to accomplish this rotation of fuselage 22, the previously mentioned vertical spindle is connected to the arms 38 which support the motor 36. The octagon 40 supports the brackets 42 which in turn support the steps 44, and another step 44a is carried by the side of fuselage 22. A door 46 may be opened and closed to allow entrance to and exit from the fuselage 22, and a hood 48 is slidably mounted upon the top of the fuselage in order that the student may be completely enclosed in the fuselage during his practice sessions therein. Upon the side of fuselage 22 are mounted a plurality of inspection doors 50 which may be selectively removed to permit inspection of the mechanism inside fuselage 22.

The previously described trainer is well known to the prior art, and for details of its construction reference is made to U. S. Patents 1,825,462 and 2,099,857 issued to Edwin A. Link.

Also forming a part of the training apparatus of the type with which this invention is being illustrated is the desk 52 upon the top of which is mounted a chart 54 of the area in which it is assumed the fuselage 22 is flying during the practice session in question. Mounted upon the chart 54 is the conventional recorder designated generally 56, this recorder sometimes being referred to as the flight simulating device. Recorder 56 has two propelling wheels 58 (only one shown) and an inking wheel 60, these three wheels supporting recorder 56 upon chart 54. Recorder 56 is connected to the fuselage 22 by means of cables 62 and 62a, the former cable passing through and being held by pipe 64 in order that the cable 62 will not interfere at any time with the movements of recorder 56. As is well known to the prior art, the propelling wheels 58 may be rotated at a rate dependent upon the instant assumed ground speed of the fuselage 22, this assumed ground speed in turn being dependent upon the instant assumed factors of fuselage heading, fuselage airspeed, wind speed, and wind direction. Accordingly, recorder 56 moves over chart 54 at a rate dependent upon instant assumed ground speed. The two propelling wheels 58 and the inking wheel 60 are also directionally controlled so that the instant direction of movement of recorder 56 over chart 54 depends upon the instant assumed track of fuselage 22. Instant assumed track also depends upon the same four just mentioned factors. Inasmuch as the recorder 56 covers a large area upon the chart 54, the inking wheel 60 is selected to designate the exact assumed geographical position of fuselage 22.

For a detailed description of the construction and operation of the recorder 56, reference is made to U. S. Patent 2,179,663 issued to Edwin A. Link. For a detailed disclosure of the apparatus for causing the speed of travel and direction of travel of recorder 56 to be in accordance with the above four stated factors, reference is made to the copending application of Gunne Lowkrantz and Karl A. Kail, Serial Number 406,056, filed August 8, 1941, for Wind drift instrument, assigned to the same assignee as my invention contained herein.

All of the preceding disclosed apparatus, being well known to the prior art, forms no part in and of itself, of this invention, but is highly useful when used in combination with the invention which will now be disclosed.

Fixedly supported by the desk 52 is the tubular metal framework designated generally by 64, this framework including two U-shaped members 66 interconnected by the transverse members 68. A plurality of angularly disposed members 70 are also provided to strengthen the U-shaped members. Depending from the top of the framework 68 are the vertical supporting members 72 which support the large wooden box 74 which in turn supports the transmitting assembly designated generally by 76 which forms an important part of this invention.

Figure 3:
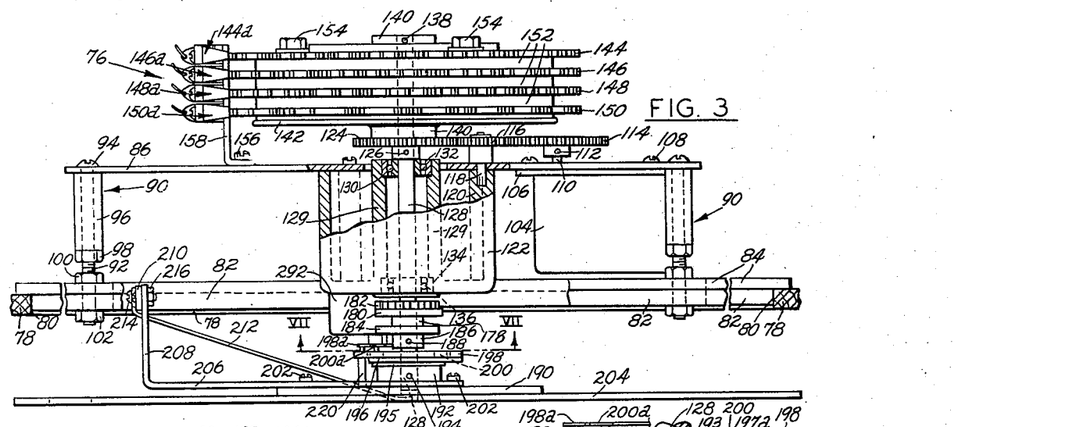
Fig. 3 is a partial cross-sectional view of the transmitting assembly.
Figures 4, 6, 7, 8, 9:
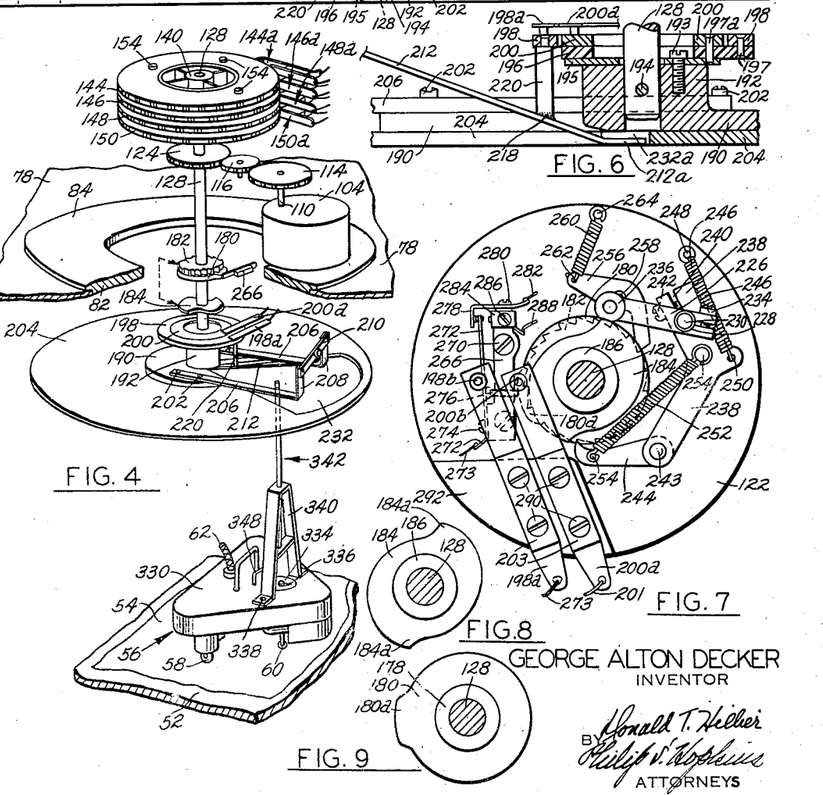
Fig. 4 is a simplified perspective view of the same with certain parts omitted.
Fig. 6 is a partial cross sectional view taken along the line VI—VI of Fig. 6A.
Fig. 7 is a cross sectional view taken along the line VII—VII of Fig. 3.
Figs. 8 and 9 show in detail the cams of Fig. 7.

Reference is now made to Fig. 3 which is a partial cross sectional view of the transmitter assembly 76 and to Fig. 4. In Fig. 3 the bottom of the box 74 is designated 78, and it will be seen that a circular hole 80 is cut in bottom 78. A circular disc 82 having a flange 84 is mounted upon the bottom 78 so that the flange 84 overlies the edge of bottom 78 around hole 80. Located some distance above the disc 82 is a second disc 86 which is supported by three spacing assemblies designated generally by 90, only two of these spacing assemblies being shown. Inasmuch as all three of these spacing assemblies are identical in construction, only the left one in Fig. 3 will be described in detail. Each of these assemblies comprises a bolt 92, threaded at its lower end and having a head 94 engaging the top of disc 86. A sleeve 96 encircles bolt 92, the upper end of this sleeve engaging the lower side of disc 86. A nut 98 is threaded upon the bolt 92 and engages the lower end of sleeve 96. A second nut 100 is threaded on bolt 92 and engages the upper side of disc 82, while a third nut 102 is threaded upon the lowermost end of bolt 92 and engages the lower side of disc 82. By virtue of the arrangement of the spacing assemblies 90, the distance of the disc 86 from the bottom 78 of box 74 may be selectively adjusted, for reasons which will later appear.

A synchronous motor 104 is provided, and this motor may be connected to a suitable source of power and a simple on-off switch to run at the rate of two revolutions per minute. A flange 106 is affixed to the housing of motor 104, this flange being held adjacent the lower side of disc 86 by means of screws 108. The output shaft of motor 104 is designated 110, and affixed upon the output shaft by means of pin 112 is the spur gear 114 which drives gear 116. Gear 116 is rotatably mounted upon the stud 118 which passes through the disc 86, the lower end of this stud being press-fitted into the boss 120 which is integrally formed with and upon the outside of the housing 122 which may be in the form of a casting. Gear 116 in turn drives the gear 124 which, by means of set screw 126, is affixed upon the central vertical shaft 128. The inner circular cylinder 129 of housing 122 is recessed at 130 for the reception of the outer race of the ball bearings 132, the inner race of this bearing being press-fitted upon the central vertical shaft 128. The lower central portion of housing 122 is also recessed at 134 for the reception of the outer race of ball bearing 136, the inner race of this bearing being fitted upon the adjacent portion of shaft 128. The gear 124 is at a 1:1 ratio with gear 114, and therefore the central vertical shaft 128 rotates at the same rate as the output shaft 110 of motor 104, viz., 2 R. P. M.

Affixed upon the upper end of central shaft 128 by means of pin 138 is the hub 140 of the cam supporting casting 142. Four circular cams 144, 146, 148, and 150 are carried by member 142, each of these cams being separated from the adjacent cam or cams by means of a spacer 152. A plurality of studs 154 fixedly position the cams 144, 146, 148 and 150, as well as the spacers 152 upon the supporting member 142.

It will therefore be appreciated that each of the cams rotates with the shaft 128 at the rate of two revolutions per minute.

The upper three cams in Fig. 3 are the directional coding cams, i. e., they are used in a manner to be later more fully explained to establish distinctive code signals in different sectors in a manner to simulate the operation of the real YG or ZB ranges as previously explained. Three such cams are provided in order that three different patterns of directional coding may be selectively used by the instructor in charge of training the student in fuselage 22. It will be appreciated that the peripheral pattern of any one of these three cams may be selected in order to simulate any desired pattern of directional coding. Furthermore, any one of these three cams may be replaced by substitute cams to simulate different directional coding patterns.

The lowermost cam 150 is provided in order that the practice of intermittently sending out station identification signals may be simulated. Cam 150 is therefore referred to as the station or transmitter identification cam. The peripheral pattern of this cam may be made as desired, and it also may be replaced by a different cam having a different station identification peripheral pattern.

There is mounted upon the plate 86 by means of screw 156 the bracket 158, bracket 158 in turn supporting the four switches 144a, 146a, 148a and 150a, respectively engaging the cams 144, 146, 148 and 150.

Figure 5:
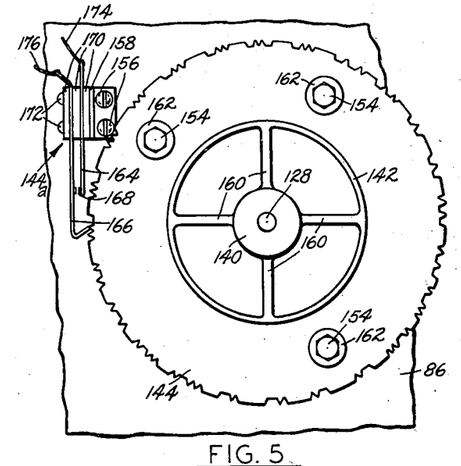
Fig. 5 is a top view of one of the directional coding cams and the switch operated thereby.

Reference is now made to Fig. 5 which is a top view of the cam assembly. The cam 144 is clearly shown, as is the switch assembly 144a. The central shaft 128 and the hub 140 as well as the outer ring of casting 142 are shown, and it will be seen that the outer ring 142 is connected to the hub 140 by means of the four radial supporting members 160. The studs 154 may also be seen, as are the washers 162 which are placed between the heads of the studs 154 and the cam 144.

Each of the switches 144a, 146a, 148a and 150a is identical in construction, and therefore only the parts of switch 144a will be described in detail. The switch 144a includes a fixed contact 164 and a movable contact 166, the end of contact 166 being bent back because the cam 144 rotates clockwise as seen in Fig. 5. It will be appreciated that the points 168 of switch 144a open and close, as cam 144 is rotated, in accordance with the peripheral pattern of cam 144. Each of the contacts 164 and 166 of switch 144a is carried by the insulating members 170 which are affixed to bracket 158 by means of screws 172. The conductor 174 is connected to the end of contact 164 while conductor 176 is connected to the end of contact 166.

Referring now to Fig. 3 it will be seen that a sleeve 178 is freely mounted upon the central vertical shaft 128, and press-fitted upon this sleeve are the cam 180 and ratchet 182. Accordingly, sleeve 178, cam 180 and ratchet 182 are freely mounted to move as a unit with respect to the shaft 128. A second cam 184 having an integral collar 186 is affixed upon shaft 128 by means of pin 188. In Figs. 3 and 6, the circular disc 190 having an integral collar 192 is affixed upon the lower end of shaft 128 by means of pin 194. Suitably affixed upon the top of collar 192 by means of screw 193 is the metal disc 195, and upon the top of disc 195 is the insulating disc 196 upon which are affixed the mutually insulated collecting rings 198 and 200. Ring 198 is affixed to insulating disk 196 by means of pin 197, and collector ring 200 is in electrical contact with the collar 192 by means of pin 197a which holds ring 200 and insulating disk 196 relative to disc 195. A collector brush 198a is mounted in a manner which will be later fully described to engage at all times the outer collecting ring 198, and a similar brush 200a, similarly mounted, engages at all times the inner collector ring 200. Affixed to the disc 190 by means of studs 202 are the metallic shield 204 and the antenna supporting brackets 206. Each of the brackets 206 has an integral vertical extension 208, the upper ends of each of these extensions supporting the transverse "bakelite" member 210. The transmitting antenna is designated 212, this antenna taking the form of a simple cylindrical metallic member.

Figure 6A:
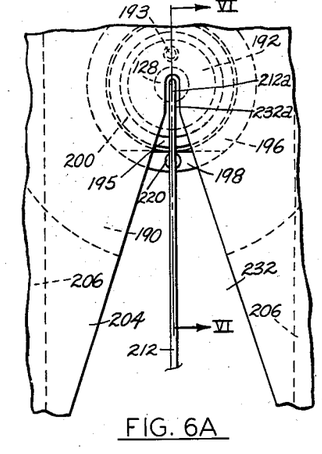
Fig. 6A is a detail view of the bottom of a portion of the transmitting antenna and shield.

Referring also to Figs. 4 and 6A, it will be seen that a pie-shaped portion 232 is cut out of the shield 204, the sides of this pie-shaped area being approximately 40 degrees from one another. The antenna 212 not only slants upwardly from the lowest point which is coincident with the axis of shaft 128, but this antenna bisects the angle formed by the sides of the pie-shaped area 232. The outer upper end of antenna 212 is held by means of bolt 214 and nut 216 to the transverse insulating member 210, while near its lower inner end antenna 212 is soldered at 218 to the lower end of stud 220, the upper end of which engages the outer slip ring 198. The bottom edge of the lowermost end 212a of antenna 212 is in the same plane as the lower surface of plate 204, and the cut-out portion 232 is extended at 232a to receive the end 212a of antenna 212.

In view of the preceding disclosure it will be appreciated that the vertical shaft 128 makes two revolutions per minute, and that all of the elements fixed thereupon or thereto, directly or indirectly, rotate about the axis of this shaft at the same rate. Such elements include the cams 144, 146, 148 and 150, the cam 184, slip rings 198 and 200, disc 190, the shield 204 with its pie-shaped cut-out portion, as well as the transmitting antenna 212. Accordingly the field established by the antenna 212 is rotated through 360° twice each minute. The exact characteristics of this field will be later more fully described.

Reference is now made to Fig. 7 which is a cross-sectional view taken along the line VII—VII of Fig. 3, looking upwardly. In Fig. 7 the central shaft 128, collar 186, cam 184, cam 180, and ratchet 182 are shown. The relative vertical positions of the two cams and ratchet, as shown in Fig. 3, should be borne in mind. It will be recalled that cam 184 is affixed upon shaft 128 for rotation therewith, while the cam 180 and ratchet 182 are affixed upon the sleeve 178 which is free to rotate with respect to shaft 128.

In Fig. 7 it will be seen that an arm 226 is affixed upon the sleeve 228 which is rotatably mounted upon the pin 230 which in turn is affixed in the bottom of housing 122. Sleeve 228 is rotatable with respect to pin 230. The right end of arm 226 is slotted and a screw 234 is provided in order that arm 226 may be affixed upon sleeve 228. A roller 236 is mounted upon the unpivoted end of arm 226 and is held in the same plane as the cam 184. A lever 238, shaped as shown, is slotted at 240 and is provided with a screw 242 in order that it may be tightened upon the rotatable sleeve 228 to be moved by the arm 226. Upon the other end of lever 238, is pivotally mounted by means of pin 243 the dog 244 which lies in the same plane as the ratchet 182 in order to engage the same. A first spring 246 is provided, one end of this spring being held by the pin 248 in turn held by the lower end of housing 122, and the other end of this spring being anchored in the hole 250 in arm 238. A second spring 252 is provided, one end of this spring being held by the pin 254 carried by the dog 244, and the other end of this spring being held by pin 254 carried by arm 238.

A second dog 256 is pivotally mounted upon the pin 258 and is in the same plane as ratchet 182 in order to engage the teeth of the same. A spring 260 has one end anchored to the dog 256 at the hole 262 while its other end is anchored to the pin 264 carried by the bottom of housing 122.

Reference is made to Fig. 9 which shows the outline of the cam 180, it being seen that this cam is circular throughout the greater portion of its periphery, but it has a raised portion 180a which occupies approximately one-tenth of the circumference of the cam.

Referring back to Fig. 7 it will be seen that an insulating member 266 is affixed to the bottom of housing 122 by means of screws 270. A resilient switch member 272 is affixed to the insulating member 266 by means of screw 274, and is connected to brush 198a through conductor 273. The insulating member 266 is drilled transversely for the reception of the plunger 276 which lies in the same plane as the cam 180 in order that this plunger may move the switch member 272 according to the rotatable position of cam 180. A first fixed contact member 278 is affixed upon the insulating member 266 by means of screw 280, and the conductor 282 is connected to this contact. A second contact 284 is mounted upon the insulating member 266 by means of screw 286, and conductor 288 is connected to contact 284.

Also seen in Fig. 7 are the two brushes 198a and 200a which are carried by insulators 203 which in turn are held by the screws 290 which engage the depending projection 292 of the housing 122. The brush 198a has a contact point 198b which engages the slip ring 198 at all times, and the brush 200a has a similar contact point 200b which bears against the slip ring 200 at all times.

Considering now the operation of the apparatus shown in Fig. 7, it will be recalled that the shaft 128 makes two revolutions per minute. The direction of rotation of this shaft in Fig. 5 is clockwise, but counterclockwise in Fig. 7. The cam 184 has two projections 184a and accordingly four times each minute the roller 236 is moved away from the center of shaft 128, resulting in four movements toward the shaft 128 of the end of lever 238 carrying dog 244. Accordingly the dog 244 advances the ratchet 182 four notches per minute. The spring 252 merely maintains the dog 244 in engagement with the ratchet 182 at all times, while spring 246 maintains roller 236 in contact with the periphery of cam 184 at all times. Spring 250 maintains the dog 256 in engagement with ratchet 182 at all times so that during the rearward movement of dog 244 the ratchet 182 is not reversed in direction.

Ratchet 182 may be provided with 20 teeth, and accordingly it makes one complete rotation each five minutes. The cam 180 rotates with ratchet 182, and consequently it also makes one complete rotation each five minutes.

Inasmuch as the projection 180a of cam 180 occupies approximately one-tenth of the circumference of cam 180, projection 180a will engage the plunger 276 for 30 seconds out of every five minutes, or for one rotation of the antenna 212. When so engaged, plunger 276 is moved to the left in Fig. 7, forcing the resilient switch member 272 away from contact 284 and into engagement with the contact 278. This engagement will continue for the duration of thirty seconds, whereupon projection 180a is moved beyond plunger 276, and the resilience of switch member 272 forces the plunger 276 to the right in Fig. 7, and switch member 272 engages the contact 284. This engagement will continue for a period of four and one half minutes, or for nine rotations of antenna 212, whereupon the projection 180a will again engage plunger 276, and the cycle is again started.

By means of the apparatus shown in Fig. 7, it will be later shown that the signal field established by the antenna 212 may for a period of four and one half minutes or for nine rotations of antenna 212 be coded with directional coding signals, and that for the ensuing 30 seconds or for one rotation of antenna 212 the established field may be coded by the station identification signals. Then the cycle is recommenced.

Figure 10:
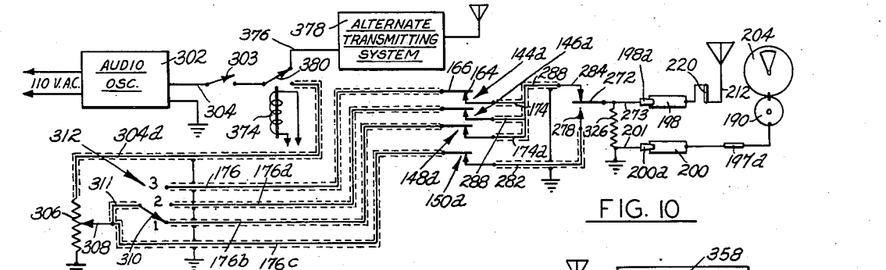
Fig. 10 is a schematic wiring diagram of the signal transmitting system.

Reference is now made to Fig. 10 which is an electrical wiring diagram of the transmitting system which may form an important part of this invention. In Fig. 10 there is shown a grounded audio oscillator 302 which may be of any conventional construction. This oscillator is connected through the shielded cable 304, on-off switch 303, relay operated switch 380 and shielded cable 304a with potentiometer 306 which may have one end grounded. The potentiometer rotor is designated 308 and is under the control of the volume control 308a shown in Fig. 11, the position of which is also shown in Fig. 2. Rotor 308 is in turn connected to the rotor 310 by means of shielded cable 311, rotor 310 forming a part of the selector switch designated generally by 312. Rotor 310 is under the control of the selector control knob 310a, also shown in Fig. 11. The rotor 310 may be positioned by the instructor to selectively engage any one of the contacts designated 1, 2 and 3. Terminal 3 is connected by shielded cable 176 to the movable member 166 of the switch 144a. This switch has previously been described in detail and, as shown in Fig. 5, is under the control of the upper directional coding cam 144. The fixed contact 164 of switch 144a is connected through the shielded conductor 174 and shielded conductor 288 to the fixed contact 284, also shown in Fig. 7. The movable contact 272, also shown in Fig. 7, is connected through the conductor 273 with the brush 198a which, it will be recalled, is in engagement at all times with the slip ring 198. As previously explained, slip ring 198 is electrically connected to the antenna 212 by means of the pin 220, as shown in Fig. 6.

The terminal 2 of selector switch 312 is connected by means of the shielded conductor 176a to the movable contact of switch 146a, which it will be recalled is constructed identically the same as switch 144a, and is under the control of the directional coding cam 146. Switch 146a is connected by shielded conductor 288 and the previously described intermediate conducting elements with the transmitting antenna 212.

The terminal 1 of selector switch 312 is connected by means of shielded cable 176b with movable contact of the switch 148a which also is like switch 144a, switch 148a being under the control of the directional coding cam 148. The fixed contact of switch 148a is in turn connected to antenna 212 through the shielded cables 174a and 288 and the intermediate connecting elements.

At the same time the potentiometer rotor 308 is connected through the shielded conductor 176c with the movable contact of switch 150a which, it will be recalled, is also identical with switch 144a. The fixed contact of switch 150a is connected through the shielded cable 282, with the second fixed contact 278 selectively engaged by the movable contact 272, as seen in Fig. 7. Contact 278 is connected through the movable contact 272 and previously described electrical connecting members with the antenna 212.

The shielded cables shown in Fig. 10 are grounded, as indicated in that figure, and the shielding plate 294 is electrically connected to the disc 190 which in turn is connected to the slip ring 200 through the pin 197a, as previously described in connection with Fig. 6. Slip ring 200 is in turn engaged by brush 200a which is grounded through the conductor 201.

A resistor 326 interconnects the conductor 273 and conductor 201 for purposes to be later explained.

Referring now to Fig. 10, it will be appreciated that when the oscillator switch 303 is closed the audio signal generated by the oscillator will pass along conductor 304 to the potentiometer 306, if switch 380 is properly positioned. The signal will be picked up by rotor 308 at a volume dependent upon the position of rotor 308 relative to potentiometer 306, and the signal will pass along the shielded cable 176c to the movable contact of switch 150a which is under the control of the station identification cam 150. As the cam 150 is rotated through two revolutions each minute, switch 150a will be intermittently opened and closed in accordance with the station-identification peripheral pattern of this cam, and a signal will pass along the shielded cable 282 to the fixed contact 278, this signal having a pattern determined by the peripheral pattern of cam 150. Accordingly, the fixed contact 278 is always energized with a signal, the pattern of which depends upon the peripheral pattern of station identification cam 150.

It will also be appreciated that at the same time the signal generated by oscillator 302 passes along the shielded cable 311 to the movable contact 310, and depending upon the position of this contact, i. e., whether it engages terminal 1, 2 or 3, the signal will pass along one of the shielded cables 176, 176a, or 176b to the movable contact of one of the switches 144a, 146a, or 148a. It will be recalled that these switches are respectively under the control of the directional coding cams 144, 146, and 148. These three switches, when the apparatus is in operation, are each constantly opening and closing in a pattern corresponding to the peripheral pattern of the cam which controls each switch. Dependent upon the position of the rotor 310, a signal having a code pattern dependent upon which switch 144a, 146a, or 148a is selected will pass along the shielded cable 288 to the fixed contact 284. Accordingly, the fixed contact 284 is always energized in a directional coding pattern dependent upon the code pattern of the selected switch 144a, 146a, or 148a.

It has been previously explained in connection with the construction shown in Fig. 7 that the movable resilient contact 272 alternately engages the contact 284 and the contact 278—contact 272 engaging the contact 284 for a period of four minutes and a half and then under the operation of the cam 180 engages the contact 278 for a period of thirty seconds, followed by another period of four and a half minutes of engagement with the contact 284, etc. Accordingly, in Fig. 10, during the four and one half minute period when contact 272 engages the fixed contact 284, the directional coding signals will be carried along conductor 273 to the brush 198a where they will be transferred to the slip ring 198 and conducted by means of the pin 229 to the transmitting antenna 212. The antenna 212 will, during the same four and one half minutes, rotate through 360 degrees exactly nine times to establish a rotating field having a code pattern dependent upon the peripheral pattern of one of the cams 144, 146, or 148. Clearly, this pattern may be the same as that shown in Fig. 1.

Upon the expiration of the four and one half minute period, the flexible contact 272 will be moved into engagement with the fixed contact 278, and during the one half minute period of this engagement, or for one complete rotation of antenna 212, antenna 212 will be energized in a code pattern corresponding to the peripheral pattern of the identification cam 150. The rotating field established by antenna 212 will, of course, be similarly coded.

Inasmuch as the antenna 212 and the shield 204 having the cut-out portion 232 will be rotated through 360° twice each minute, not only is the field established by antenna 212 alternately coded with directional coding signals and station identification signals but a field established by antenna 212 is constantly rotated in the clockwise direction, as seen from above, through 720 degrees each minute. The peripheral pattern of each of the three cams 144, 146 and 148 is arranged so that as antenna 212 is rotated, distinctive code letters are transmitted as shown in Fig. 1 in the various sectors. The peripheral pattern of station identification cam 150 is, of course, such that the two station identification letters will be transmitted eight times during the one rotation of antenna 212. All four identification cams are properly oriented with respect to shaft 128 so that the correct signals are transmitted in the proper assumed directions with respect to the orientation of chart 54 of Fig. 2, upon which may be marked the assumed cardinal and other directions (north, east, etc.).

Reference is now made to Fig. 4 where the recorder or flight simulating device 56 is shown resting upon the map or chart 54 which in turn is held by the top of table 52. The top of the recorder is designated 330, and this top carries the azimuth scale 334. A pointer 336 is mounted for movement relative to scale 334, pointer 336 being affixed for movement with the inking wheel 60 in order to indicate the instant track or assumed direction of movement over the ground of the fuselage 22.

Figure 12:
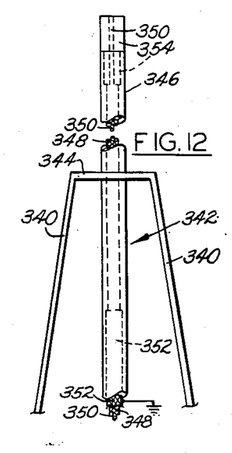
Fig. 12 shows the receiving antenna, certain parts being cut away for purposes of illustration.

Affixed upon the top of the recorder by means of screws 338 is the bracket 340 which supports the receiving antenna designated generally by 342. The receiving antenna, as will be seen, extends vertically, and its axis is coincident with the point at which the inking wheel 60 touches chart 54. Accordingly, the vertical axis of antenna 342 always intersects chart 54 at the instant assumed location of fuselage 22. Reference is now made to Fig. 12 which discloses in detail the antenna and bracket arrangement. The bracket 340 is seen to have an uppermost horizontal crosspiece 344 which assists in supporting the antenna 342. Antenna 342 includes an outer tubular member 346 in which is housed the insulated cable 348, the conductor within cable 348 being designated 350, and serving as the receiving antenna. Enclosed in the lower end of metal tube 346 and also encircling the insulated cable 348 is the shield 352 which may be suitably grounded.

In the top of the tube 346 is placed the insulating plug 354, through which the conductor or receiving antenna 350 passes, the upper end of receiving antenna 350 being flush with the upper end of insulator 354. As seen in Fig. 4, the shield 352 which includes antenna 350 passes through the recorder top 330, and, referring to Fig. 13, it will be seen that the antenna 350 is directly connected to the grid 356 of the tube 358 of the preamplifier 360. Also, antenna 350 is connected to ground through resistor 350a. This preamplifier preferably is contained within the housing of recorder 56. The output of the preamplifier 358 may be connected through the cable 62, also shown in Fig. 2, to a conventional amplifier 362 located in the desk 52. This amplifier may in turn be connected through the conductor cable 62a to the student's control box 364, the location of which is also shown in Fig. 2. The student's control box 364 is in turn connected through conductor 366 with the earphones 368, used by the student within fuselage 22.

Figures 11, 13:
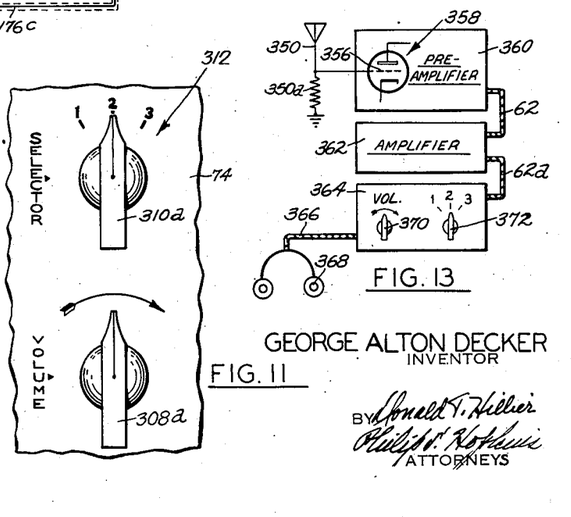
Fig. 11 shows the instructor's control panel.
Fig. 13 is a schematic diagram of the electrical parts of the receiving system.

Upon the student's control box 364 is placed the volume control 370 by means of which the student may regulate the intensity of the signals received by means of earphones 368.

It has been previously explained that the transmitting antenna 212 establishes a rotating field, the rotating field being directionally coded for a predetermined length of time and then coded with a station identification signal for a predetermined length of time, whereupon the cycle is recommenced. It will be appreciated that the top of receiving antenna 350, being placed a very short distance below the shield 204, will have a voltage induced therein, the magnitude of this voltage being dependent upon the distance of the receiving antenna 350 from the transmitting antenna 212. Inasmuch as the point upon chart 54 intersected by the axis of vertical shaft 128 represents the exact assumed position of the transmitting station, it will be appreciated that the farther the inking wheel 60 and the axis of tube 342 are from that point the weaker will be the voltage induced in antenna 350, because of the upward inclination of antenna 212. Accordingly, the greater the assumed distance of the fuselage 22 from the assumed location of the transmitting station, the weaker will be the intercepted signal. The student's volume control 370 may be used by him to regulate the intensity of the signals according to the general intensity of the signals heard by him. Secondly, the distance between the top of receiving antenna 350 and the transmitting antenna 212 is a function of the rotatable position of transmitting antenna 212 relative to the position of the top of receiving antenna 350. Thus, only when the top of receiving antenna 350 is below the cut-out portion 232 or 232a or very nearly so will a voltage be induced in receiving antenna 350. As the antenna 212 and shield 204 rotate so that antenna 350 is below the edge of cut-out portion 232 or very nearly so, a small voltage will be induced in antenna 350 and, therefore, a relatively weak signal will be heard in earphones 368. As the transmitting antenna rotates the signal intensity is increased to a maximum when the transmitting antenna is directly above receiving antenna 350, and further rotation of the transmitting antenna results in an attenuation of the signal intensity until, when the cut-out portion 232 moves a small angle past the receiving antenna, no voltage is induced in the receiving antenna, and no signal is heard in earphones 368. The entire signal duration is for approximately 45 degrees of rotation of antenna 212. Accordingly, the signal intensity is a function of the transverse displacement of inking wheel 60 from the axis of shaft 128 and of the rotatable position of antenna 212 relative to receiving antenna 350.

The code cams are, of course, formed so that the proper number of signals are transmitted during the 45 degrees of rotation of antenna 212.

Inasmuch as signals from a real YG-ZB transmitter are heard during an increasingly larger proportion of the time as a real plane approaches the transmitter, and when in the immediate vicinity of the transmitter the entire cycle of transmission is intercepted, the transmitting antenna 212 is flattened at 212a, as shown in Fig. 6, and the lower edge of the flattened end is in the same plane as the bottom of shield 204, the flattened portion 212a being in slot 232a. In this manner, when the receiving antenna 350 approaches the axis of shaft 128, the duration of intercepted signals increases, and when the receiving antenna is in the immediate assumed location of the transmitter, signals are heard throughout the entire 360 degrees of movement of the transmitting antenna 212.

It will be appreciated, therefore, that the signals heard by the student depend upon the same assumed factors which govern the signals heard by a real plane tuned to a real YG-ZB transmitter.

In view of the preceding disclosure, my invention employs means whereby an electrostatic field is created between the transmitting antenna and ground. The receiving antenna is placed in this field, and is connected to ground through a resistor. As the strength of the electrostatic field in the vicinity of the receiving antenna is varied—by coding, rotation of the transmitting antenna or movements of the receiving antenna—the voltage difference between the receiving antenna and ground is varied, and a resultant current flow through the resistor occurs. This current flow is amplified, and the resultant signals are heard by the student using the earphones.

It will be noted that the disclosed embodiment of my invention is as simple as the case admits, and is very easily and cheaply manufactured, due to a large degree to the employment of the capacitive or electrostatic transmitting and receiving means. The electrostatic field may be more easily controlled than any other known type of field, and the simplicity of the antenna and shield render the adjustment of these elements to the shape required to give the correct signal pattern a very simple matter.

The resistor 326 is employed in Fig. 10 so that the transmitting antenna 212 will operate into a constant impedance at all times. It will be appreciated that in the absence of this resistor the transmitter would operate into the extremely high impedance between the antenna 350 and shield 204. The value of this impedance changes with moisture conditions, etc. The employment of the resistor 326 not only reduces the value of this impedance, but also maintains the impedance at a constant value. Proper signal transmission is, therefore, improved.

The adjustable spacers 90 are employed so that the shield 204 may be levelled as well as separated from the top of receiving antenna 350 by the proper distance.

With the previously disclosed apparatus it has been found that the operation of real YG-ZB transmitting stations may be accurately simulated, and that the signals heard by the student using the earphones 368 faithfully simulate the signals heard by a receiver in a plane in actual flight tuned to the carrier frequency of the transmitter, under the corresponding real conditions. It will be appreciated that the directional coding and station identification cams may be given any desired peripheral pattern, and that the apparatus may be oriented in any desired manner insofar as assumed direction of transmission of any particular code letter is concerned, in order to simulate the code pattern of any particular range at any selected time. The student in fuselage 22 may be supplied with a code chart and he may, just as in actual flight, determine the assumed direction of the transmitting station from his assumed location by interpreting the intercepted signals. In order to simulate the actual "homing" upon the transmitting station, he may, upon ascertaining his assumed location from the station, place the fuselage 22 upon the proper heading. This may be accomplished by use of the magnetic compass conventionally provided in fuselage 22. The recorder 56 properly responds to changes in the orientation of fuselage 22, as is well understood by those skilled in the art, and during the "homing" process the signals will change in volume just as in actual flight when corresponding maneuvers are accomplished.

In order that actual flying conditions may be further simulated, there may be placed in the box 74 above the desk 52 in Fig. 1 a second transmitting assembly like that previously disclosed herein in Figs. 3 to 10, and the transmitter selection switch 372 in Fig. 13 may be used to energize the relay 374 in Fig. 10 to switch the signal from the oscillator 302 along the conductor 376 to an alternate transmitting system 378 which may be identical in construction and operation with the single system previously described herein in detail and shown in Figs. 3 to 10. Of course only one receiving antenna 350 and one set of elements between the receiving antenna and earphones 368 would be utilized. The provision of the second transmitting system makes possible the simulating of a real plane flying in the vicinity of two real YG-ZB transmitters, to each of which the receiving set in the plane may be tuned at will.

It will therefore be appreciated that this invention discloses apparatus which is highly useful in instructing students, upon the ground, in the navigation of aircraft by means of YG-ZB directional ranges. It will be appreciated by those skilled in the art that many changes may be made in the detailed construction of this invention without departing from the substance thereof. All such changes are intended to be covered by the following claims.

I claim:

1. A rotating radio beacon simulator for use in conjunction with a grounded aviation trainer comprising, in combination, a rotatable vertical shaft, a pair of cams mounted upon said shaft for rotation therewith, two switches each having at least two terminals and each arranged to be operated by a different one of said cams, a signal generator, a connection from said generator to one terminal of each of said two switches, a third switch and a transmitting antenna, said transmitting antenna being carried by said shaft for rotation therewith, said third switch having two stationary contacts and a movable contact for alternately engaging either of the stationary contacts, a connection from the other terminal of one of said two switches to one of the stationary contacts of said third switch and a connection from the other terminal of the other of said two switches to the other stationary contact of said third switch, a connection from the movable contact of said third switch to said antenna, and means operated by the rotation of said vertical shaft for alternately engaging the movable contact of said third switch with its two stationary contacts.

2. A rotating radio beacon simulator for use in conjunction with a grounded aviation trainer comprising, in combination, a rotatable vertical shaft, a pair of cams mounted upon said shaft for rotation therewith, two switches each having at least two terminals and each arranged to be operated by a different one of said cams, a signal generator, a connection from said generator to one terminal of each of said two switches, a third switch and a transmitting antenna, said transmitting antenna being carried by said shaft for rotation therewith, said third switch having two stationary contacts and a movable contact for alternately engaging either of the stationary contacts, a connection from the other terminal of one of said two switches to one of the stationary contacts of said third switch and a connection from the other terminal of the other of said two switches to the other stationary contact of said third switch, a connection from the movable contact of said third switch to said antenna, and cam and ratchet means operated by the rotation of said vertical shaft for alternately engaging the movable contact of said third switch with its two stationary contacts.

3. In a navigation training device of the type described the combination of a vertical shaft, a motor for rotating said shaft, an antenna carried by said shaft for rotation therewith, a switch having two stationary contacts and one movable contact, means for energizing each of the stationary contacts of said switch in a different predetermined code pattern, an electrical connection from the movable contact of said switch to said antenna, a first cam carried by said shaft for rotation therewith, ratchet means operated by said cam, and a second cam operated by said ratchet means for alternately moving said movable contact into engagement with said stationary contacts.

GEORGE ALTON DECKER.

REFERENCES CITED

The following references are of record in the file of this patent:

UNITED STATES PATENTS

| Number | Name | Date |
|---|---|---|
| 2,312,962 | De Florez | Mar. 2, 1943 |
| 2,326,764 | Crane | Aug. 17, 1943 |
| 2,352,216 | Melvin | June 27, 1944 |
| 2,359,294 | Blenman | Oct. 3, 1944 |
| 2,429,597 | Andrews | Oct. 28, 1947 |
| 2,435,502 | Lang | Feb. 3, 1948 |

OTHER REFERENCES

Air Corps News Letter, vol. 21, No. 6, March 15, 1938, pages 7 and 8.